Aug. 2, 1966  F. A. ARNDT ET AL  3,263,472
PROGRESSIVE DIE FOR MANUFACTURE OF MANUALLY
OPENABLE CROWN BOTTLE CAPS
Filed Oct. 18, 1963  7 Sheets-Sheet 1

INVENTORS
FRED A. ARNDT
ROY BARRACLOUGH
BY
*James and Franklin*
ATTORNEYS

INVENTORS
FRED A. ARNDT
ROY BARRACLOUGH
BY
*James and Franklin*
ATTORNEYS

INVENTORS
FRED A. ARNDT
ROY BARRACLOUGH
BY James and Franklin
ATTORNEYS

Aug. 2, 1966   F. A. ARNDT ET AL   3,263,472
PROGRESSIVE DIE FOR MANUFACTURE OF MANUALLY
OPENABLE CROWN BOTTLE CAPS
Filed Oct. 18, 1963   7 Sheets-Sheet 7

INVENTORS
FRED A. ARNDT
ROY BARRACLOUGH
BY
James and Franklin
ATTORNEYS

United States Patent Office 3,263,472
Patented August 2, 1966

3,263,472
PROGRESSIVE DIE FOR MANUFACTURE OF MANUALLY OPENABLE CROWN BOTTLE CAPS
Fred A. Arndt, Upper Montclair, and Roy Barraclough, Fair Lawn, N.J., assignors to United States Crown Corporation, Saddle Brook, N.J., a corporation of Delaware
Filed Oct. 18, 1963, Ser. No. 317,288
15 Claims. (Cl. 72—324)

This invention relates to dies for punching and forming sheet metal products, and more particularly to a progressive die for the manufacture of manually openable crown bottle caps.

The crown bottle cap in common use requires a bottle opener to remove the cap. It has long been suggested to provide such a cap with a sidewardly projecting tab of sufficient strength to afford manual removal of the cap. However, manually removable caps have not come into common use. The main reason is that no satisfactory die tool was available to manufacture such caps at minimum cost under high-speed mass production conditions, as is done with ordinary round bottle caps.

The general object of the present invention is to provide a die for economic high-speed volume production of manually removable crown caps.

A more specific object is to avoid possible injury by the sharp edge of the tab, and for this purpose the edge is provided with a flange which is rolled over and closed, thereby giving the tab a smooth safe edge, and also desirably stiffening the tab.

To accomplish this in a progressive die, the tab portion is lanced and provided with its rolled edge before blanking the main body of the cap. A problem then arises at the intersection of the periphery of the tab portion and the periphery of the body portion. To require the peripheries to exactly abut would demand excessive precision, and to permit them to cross would facilitate the die operation, but would weaken the connection between the tab and the body where strength is wanted for eventual opening of the cap.

One object of the present invention is to overcome this difficulty, which is done by preliminarily forming holes in substantially tangential relation at the prospective intersections of the tab outline and the body outline. This also facilitates a later desired flow of metal, to be described subsequently. Small holes may be pierced for this purpose, but that would require the removal of troublesome small pieces of scrap. An ancillary object is to avoid this difficulty, which is done by lancing instead of piercing the holes.

The standard bottle cap is ridged or crimped entirely around its periphery. One difficulty when providing a tab for manual removal is that the elimination of the usual ridges at the tab reduces the sealing action or downward pressure exerted by the cap on its gasket or liner at the tab. Accordingly, ridges are provided in the tab portion, and the present die includes forming elements for corrugating the tab. The body of the cap is formed in the usual fashion by an operation in which a forming punch or core moves the body blank into a die to cup the blank, the top periphery of the die being serrated to ridge the periphery of the blank as it is being cupped. One problem is to hold the tab portion and yet afford some movement in order to flow metal to the body as it is being cupped. To accomplish this, the ridging of the tab portion is performed by a forming die the upper part of which is somewhat yieldable. More specifically a blanking punch which blanks the body is surrounded by a resiliently yieldable stripper plate, and a forming die insert is mounted in the stripper plate, instead of in the die holder itself.

To accomplish the foregoing general objects, and other more specific objects which will hereinafter appear, our invention resides in the die elements and their relation one to another as are hereinafter more particularly described in the following specification. The specification is accompanied by drawings in which:

Figure 3:
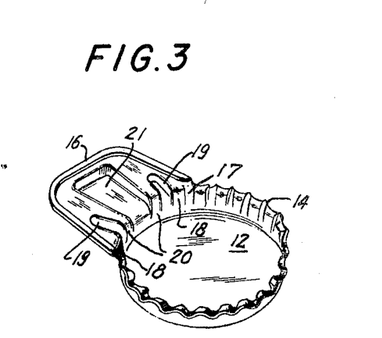
FIG. 3 is a perspective view showing a manually openable cap formed in the die.

Referring to the drawings, and more particularly to FIG. 3, the bottle cap is shown inverted as it is formed in the die. It comprises a cupped body portion 12 having a crimped or ridged periphery 14. It further comprises a sidewardly projecting tab 16 for manual removal of the cap from a bottle. When finished the top 12 of the cap receives a suitable liner or gasket (not shown) and when the cap is applied to a bottle the ridged side wall is contracted inward to lock the cap on the bottle. This modifies the angular position of tab 16, which is turned about 25° downward (upward as viewed in FIG. 3).

The usual crown cap has twenty-one ridges and channels, and the same pitch or spacing is employed for sixteen ridges and seventeen channels in the present cap. The tab is provided with four ridges instead of five, these being indicated at 18 and 20. The use of ridges at the tab maintains the desired sealing action of the cap. Moreover, the cap then may be applied to a bottle by means of most standard bottle capping machines already in use.

Figure 1:
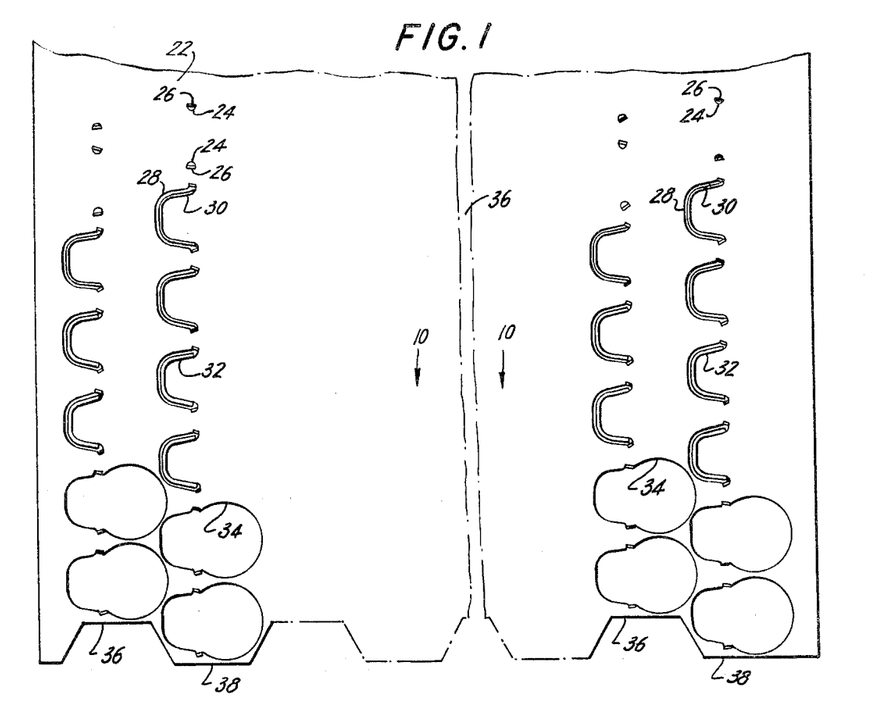
FIG. 1 is a plan view of a piece of metal sheet being operated on in the die.

Referring now to FIG. 1 of the drawing, the metal sheet 22 is fed in the direction of arrows 10. The first operation is to provide a pair of spaced holes 24. These could be pierced, but in order to eliminate the need for handling scrap, the holes 24 are preferably lanced, and small semicircular tabs of sheet metal are turned upward as indicated at 26.

The next operation is to outline the periphery of the tab, indicated at 28. This is preferably a lancing operaso performed as to provide an upwardly struck flange 30 around the perimeter of the tab. At a third station the flange is reversely folded or closed to provide a safe edge for the tab. The folded flange is indicated at 32.

At a fourth station the body of the cap is blanked, the resulting blank is cupped and corrugated, and the ridges are formed in the tab. These operations are not shown in FIG. 1, which instead has merely the opening 34 from which the blank was punched.

In FIG. 1, the parts 28, 30 are repeated, but only because station three is spaced two pitch distances from station two. Similarly, the showing at 32 is repeated, because station four is two pitch distances from station three. This provides more room around the punches, dies and strippers for the actual working station.

It will be understood that the sheet 22 is wider than here shown, it being broken away at 36. Thus, the die elements referred to may be duplicated many times, across the width of the sheet, in order to simultaneously make a large number of bottle caps. In the present case the sheet is ten caps wide.

Moreover the stock may be more economically used by staggering alternate blanks so that they nest more closely together, and this nested relation is indicated at the bottom of FIG. 1. The ten die elements are similarly staggered. If the press in which the die is mounted employs sheets rather than a continuous web, the leading and trailing edges of the sheets are preferably notched, as indicated at 36, 38 in FIG. 1. This again makes for economy when the sheets are themselves stamped from a continuous web, because the zig-zag trailing edge of one sheet mates with the zig-zag leading edge of the next sheet.

Figure 2:
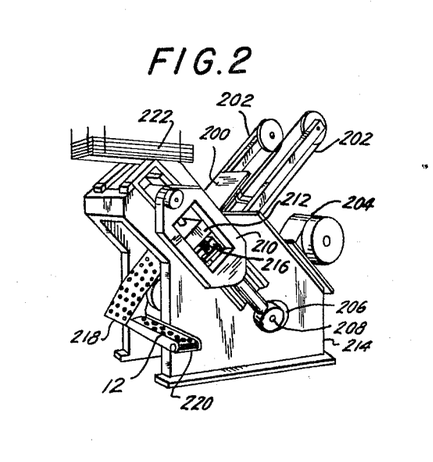
FIG. 2 is a perspective view of an example of a double acting press in which the die is used.

The die is a three part die, having three instead of the usual two punch and die holders. It is used in any suitable double acting press, and one such press is shown schematically in FIG. 2, this being one made by S.A.C.M.I. of Milan, Italy. Sheet 200 is fed step by step by chains 202 having grippers which hold the side edges of the sheet. Motor 204 drives a main shaft at 206 which has end cranks 208 and links 210 extending upward to a top head carrying a top punch holder 212. The main frame 214 carries a fixed die holder 216. Additional cranks inside the frame on the main shaft operate a bottom head carrying a bottom punch and die holder, not visible. The scrap leaves at 218, and the finished bottle caps fall gravitationally onto a conveyor 200. A stack of sheets to be operated on is shown at 222.

Figure 7:
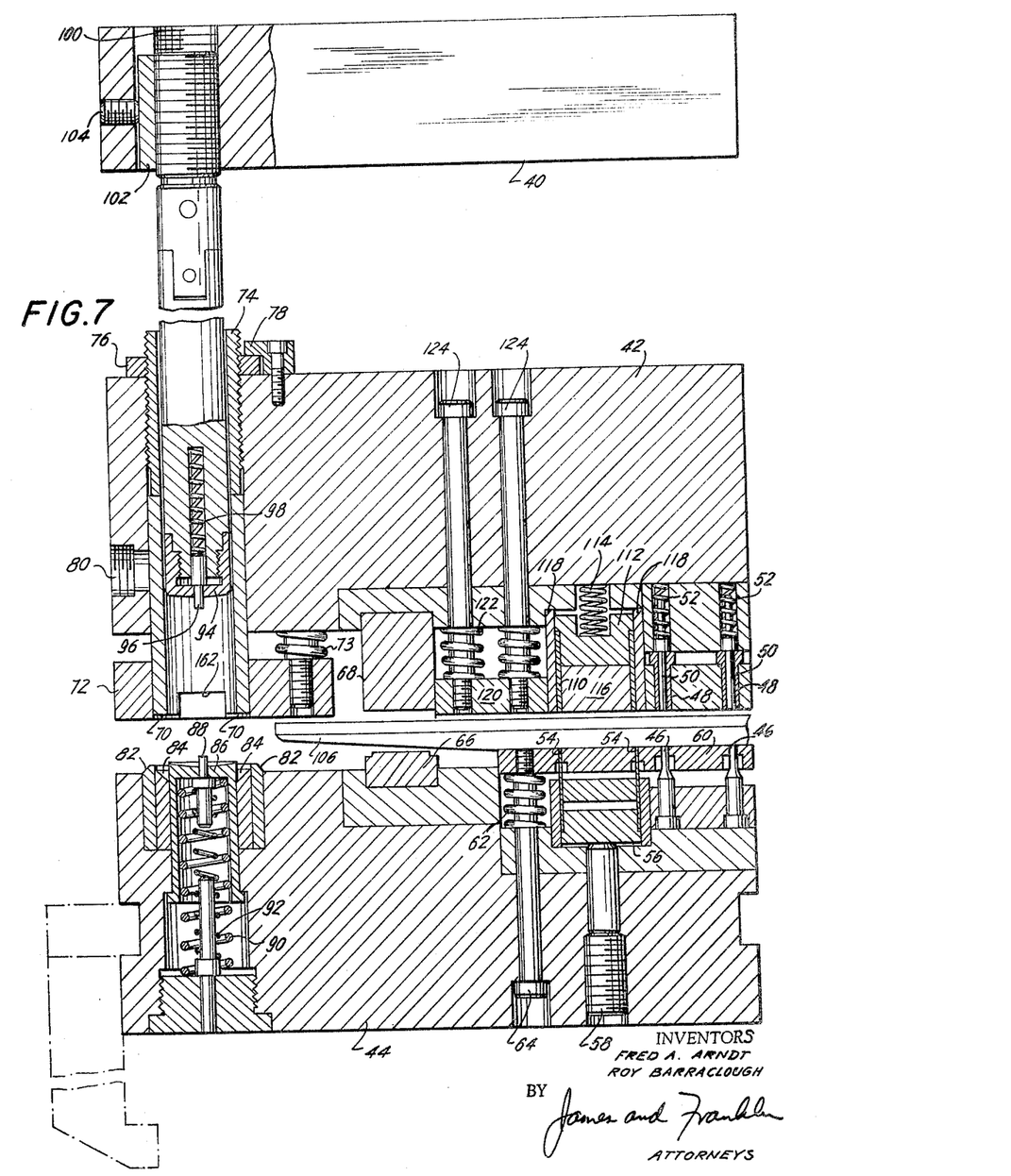
FIG. 7 is a vertical section taken through the die approximately in the plane of the line 7—7 of FIG. 4.

Referring now to FIG. 7 of the drawing, the die comprises a movable top punch holder 40 which is carried by the upper head of the press; a fixed holder 42 which is fixedly mounted in the press; and a movable bottom holder 44 which is carried by the bottom head of the press.

FIG. 7 is a section through the die in the direction of stock feed, the first station being at the right and the fourth station being at the left. The bottom holder 44 carries lancing punches 46, and the fixed holder 42 has mating dies 48. The latter preferably are fitted with stripper pins 50 which are urged resiliently downward by compression springs 52. The punches 46 have a stripper plate 60.

At the second station the bottom holder 44 carries a U shaped lancing punch 54. This is backed up at 56, its height being accurately adjustable by means of an adjusting screw 58. The lancing punch 54 is surrounded by the same stripper plate 60 as the punches 46, this plate being urged to the upper position shown by compression springs 62. The upward movement of stripper 60 is limited by the heads of tie rods 64, and is selected to stop the plate flush with the upper ends of the punches 46 and 54.

The U shaped lancing punch 54 bears against and cooperates with a thicker U shaped ejector 110 carried by the fixed holder 42. Ejector 110 is backed by member 112, and urged downward by compression spring 114. The die parts 116 and 118 are fixed. The fixed holder 42 also carries a stripper and guide plate 120, which is urged downward by compression springs 122, its downward position being limited by the heads of tie rods 124.

The third station is a forming station, the die elements for which are indicated generally at 66 and 68. Their working surfaces are more clearly shown in FIGS. 12 and 16, and it will be seen that this station serves to roll over or close the peripheral flange of the tab.

The fourth station is more complex, and it comprises a body blanking punch 70, and a resiliently yieldable stripper plate 72, on the fixed holder 42. Stripper plate 72 bears against compression springs 73. The stripper plate 72 is not merely a stripper plate but carries the upper tab-forming insert, as is described later. The position of blanking punch 70 may be adjusted by screw bushing 74 with a lock nut 76 and a lock 78. The punch is additionally locked by a clamp or set screw 80.

The blanking punch 70 is mated by a blanking die 82 which is carried by the movable bottom holder 44. There is also a serrated annular forming die 84 within the blanking die 82. A downwardly movable core 86 is disposed within the serrated forming die 84, and this in turn may carry a resilient ejector pin 88. The compression spring for core 86 is shown at 90, and the compression spring for pin 88 is shown at 92.

The fourth station additionally has a forming punch or core 94 carried by and movable with the top holder 40. This core is within the blanking punch 70 and serves with serrated forming punch 84 and core 86 to cup or crown the blank, and to ridge its periphery. The core 94 is itself fitted with an ejector pin 96 which is backed by a compression spring 98. The position of the core may be adjusted by means of a thread 100, the adjustment being locked by a shoe 102 pressed against the thread by a set screw 104.

The fourth station further comprises mating forming dies for corrugating and completing the tab, but these are not visible in the section shown in FIG. 7, and are described later.

As previously mentioned the press includes sheet feed means, such as intermittently moved chains with grippers holding the side edges of the sheet, which move the sheet intermittently a distance corresponding to the pitch or spacing between successive blanks (in vertical direction as viewed in FIG. 1). Two of the chain-carried grippers are indicated at 170 in FIG. 4.

Figure 8:
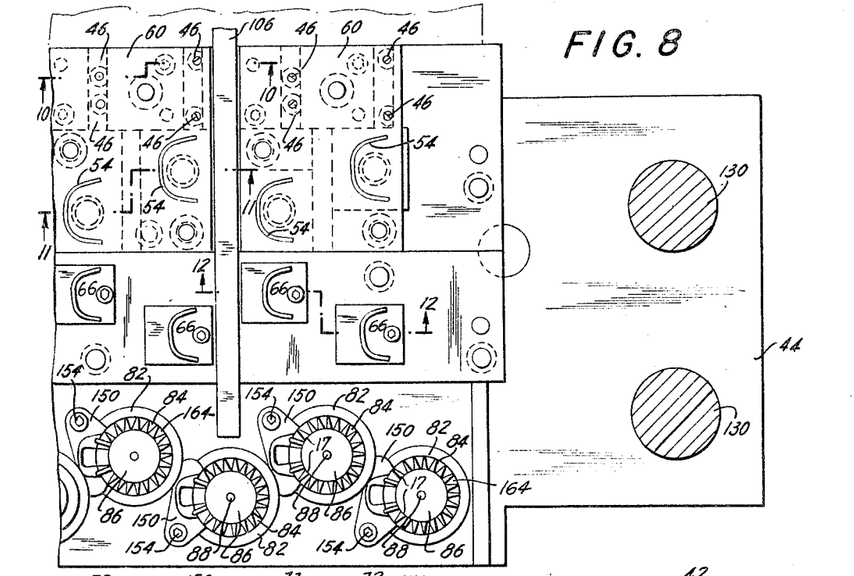
FIG. 8 is a horizontal view looking toward the bottom holder, in the direction of the arrows 8—8 of FIG. 4.

Because of the width of the sheet metal, it is preferably supported at intermediate points, as well as at its side edges. In the present case, there are four support bars, one of which is indicated at 106 in FIG. 7. It will be noted that this support bar extends through stations 1, 2 and 3, but stops short of station 4. The reason for this will be evident from inspection of FIG. 1, in which it is seen that there is ample space for a support bar between the punches in the stations 1, 2 and 3, but at station 4 the complete blanks are so closely nested that there would be no room for a support bar. In FIG. 8, the support bar 106 is shown passing through the first, second and third stations, indicated respectively by the section lines 10—10, 11—11, 12—12, but terminating short of the fourth station, where there would be no room for such a support bar. Only one bar 106 is shown in FIG. 8, but it will be understood that there are a number of such bars at intervals across the width of the sheet. We use four bars, dividing the stock into five spaces, each two blanks wide.

Figure 10:
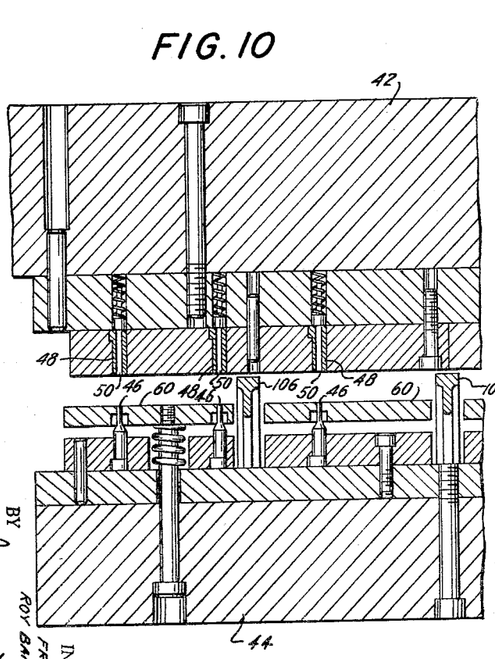
FIG. 10 is a vertical section through the first station, taken approximately in the plane of the line 10—10 of FIG. 8.
Figure 11:
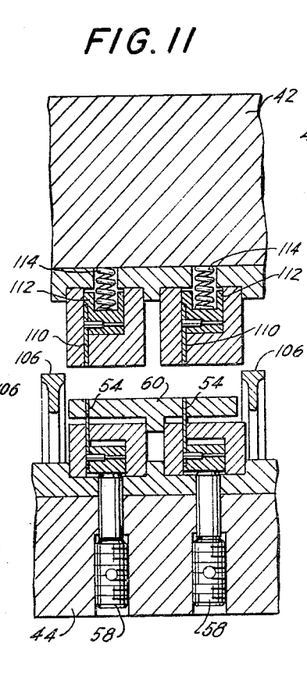
FIG. 11 is a vertical section through the second station, taken approximately in the plane of the line 11—11 of FIG. 8.

Further reference may be made to FIGS. 10 and 11, which show support bars 106, and further show how the stripper plates are located between the support bars. The bars appear elevated because they support the sheet near the die elements of the fixed holder 42, it being kept in mind that in the present case it is the bottom holder 44 that moves upward toward the fixed holder 42.

Figures 4, 5, 6:
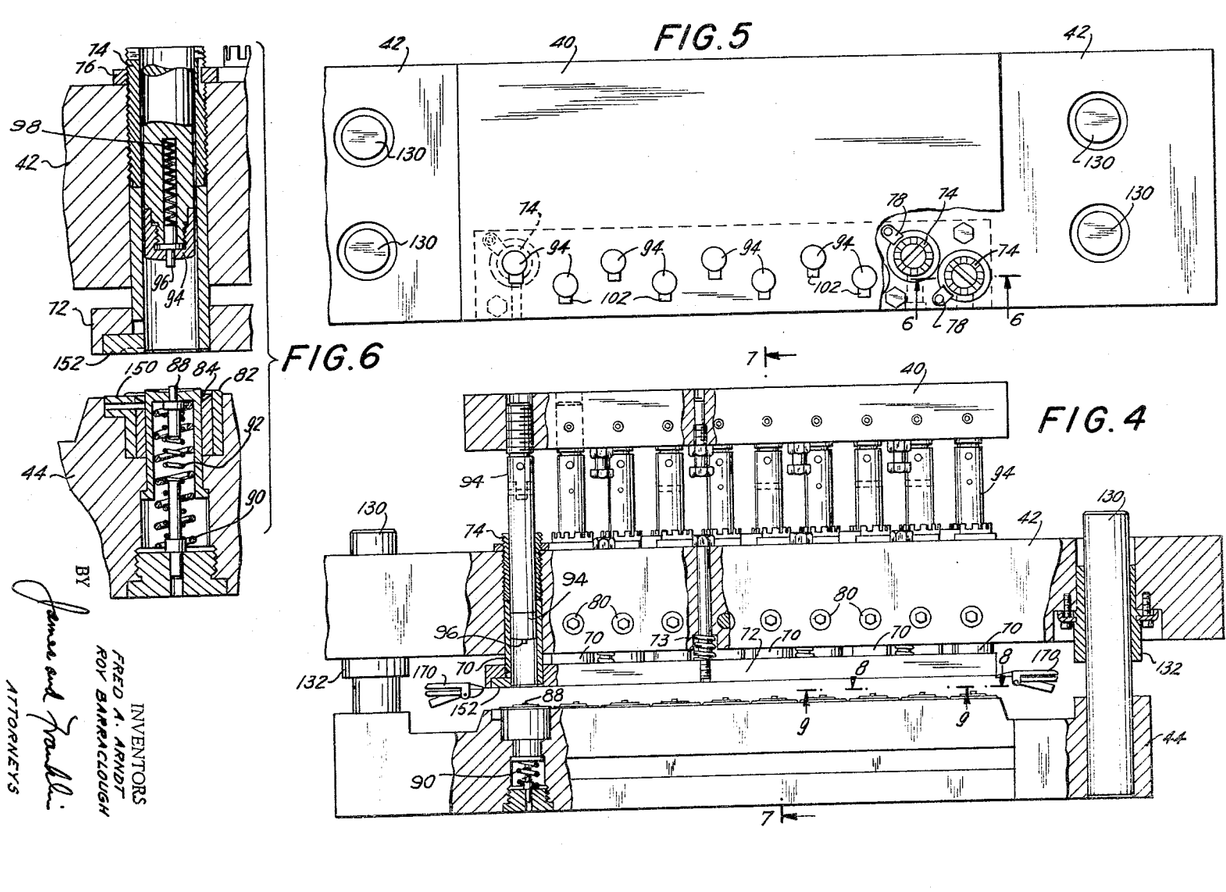
FIG. 4 is a front elevation of the die, with parts cut away.
FIG. 5 is a plan view.
FIG. 6 is a fragmentary vertical section through one of the stations, taken approximately in the plane of the line 6—6 of FIG. 5.

FIGS. 4 and 5 show the pilots 130 which slidably align the movable bottom holder 44 with the fixed middle holder 42, the latter having pilot bearings 132. Pilots also may be provided between the movable top holder 40 and the fixed holder 42, but in the present case these have been omitted because of the slidable guide relation provided by the ten cores 94 in the mating ten blanking punches 74, 70.

STATION NUMBER 1

Figure 13:
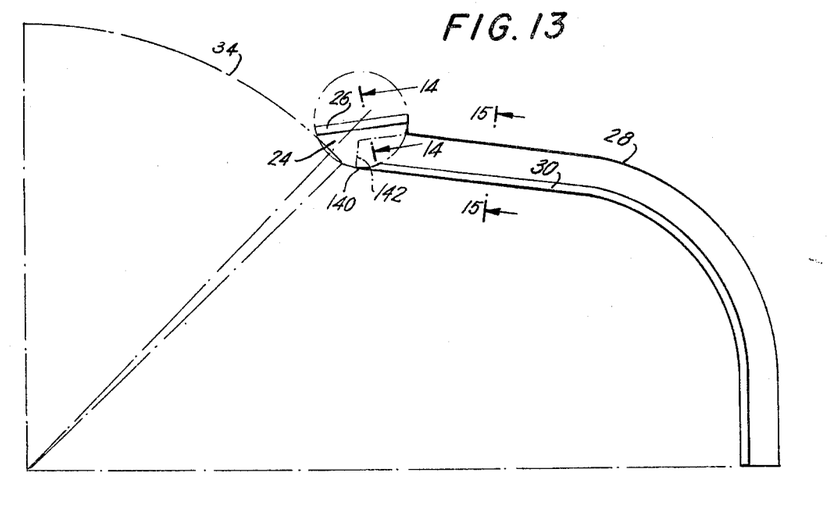
FIG. 13 shows a fragment of the periphery of the blank drawn to greatly enlarged scale in order to explain a feature of the invention.

Referring first to FIG. 13 of the drawing, the periphery of the cap blank is indicated at 34. The periphery of the tab is indicated at 28, and its upwardly lanced flange is shown at 30. The intersection of lines 28 and 34 would be at the point 140, the line 28 being completed as shown in broken lines at 142. To make such lines meet exactly in abutting relation at two separate stations is very difficult and requires undue precision. For many purposes the problem is solved by permitting the lines to intersect, that is, to cross slightly, but for the present purpose this would be undesirable because it would weaken the cap structure between the tab and body, just where it should have maximum strength for dislodging the cap when opening a bottle.

This problem is solved in the present case by preliminarily forming a hole 24 which may be substantially tangent at the intersection. If the hole were being pierced, a round hole would be used for simplicity. However, piercing would require the disposition of scrap, and to avoid this we prefer to lance the hole 24 rather than to pierce it. In such case, the hole is preferably made approximately a semicircle, the resulting bit of metal being turned upward at or near a diameter, as indicated at 26.

Figure 14:
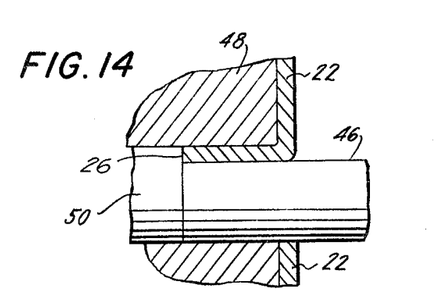
FIG. 14 is a fragmentary vertical section taken approximately in the plane of the line 14—14 of FIG. 13, at the first station.

This operation is shown at enlarged scale in FIG. 14, in which upwardly moved punch 46 has lanced sheet metal 22, the displaced metal being folded upward at 26. The die 48 has a hole which is larger than punch 46 by the amount needed to receive the upwardly turned metal 26. The die may be fitted with an ejector finger 50 which is similarly larger than the punch, and which moves upward with punch 46.

Figure 9:
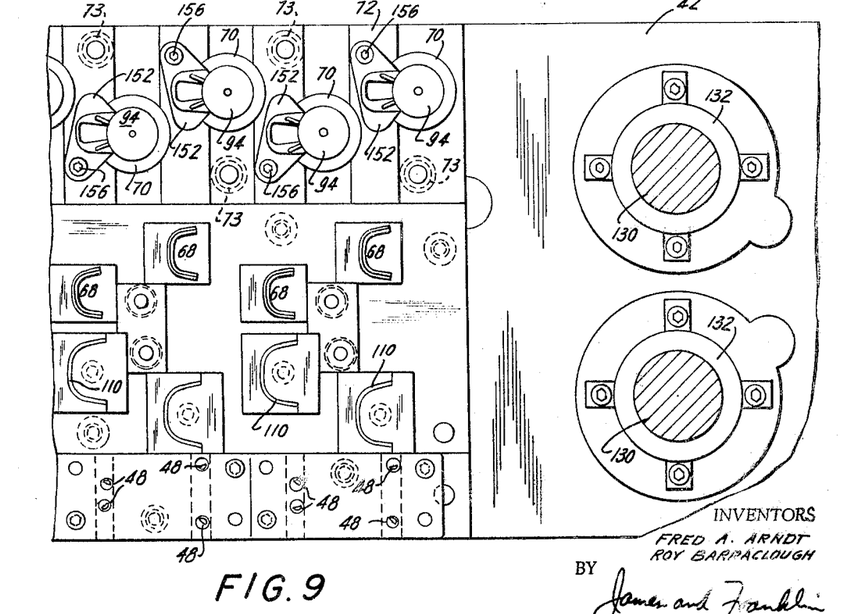
FIG. 9 is a horizontal view looking toward the fixed holder, in the direction of the arrows 9—9 of FIG. 4.

These parts have already been described and are similarly numbered in FIG. 7, and are also shown in FIGS. 8 and 9, the punches being shown at 46 near the top of FIG. 8, and the mating dies being shown at 48 near the bottom of FIG. 9. The punches 46, mating dies 48, and ejectors 50 are also shown in FIG. 10. The station also has a stripper plate 60 around the punches 46.

In FIG. 13 it will be noted that the hole 24 removes some metal which otherwise would be flanged. This is later desirable in facilitating flow and channeling of metal in station 4 when cupping the blank.

STATION NUMBER 2

Figure 15:
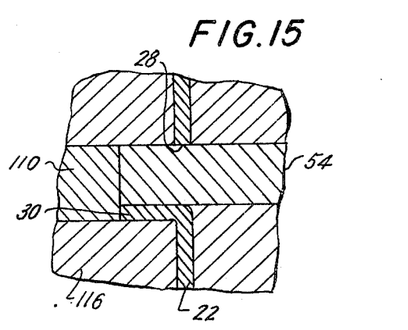
FIG. 15 is a fragmentary vertical section taken approximately in the plane of the line 15—15 of FIG. 13, at the second station.

Reverting to FIG. 13, the second station defines the tab by lancing the sheet on a U shaped outline 28, and it forms a narrow peripheral flange which is turned upward at 30. This is shown to larger scale in FIG. 15, in which lancing punch 54 severs sheet 22 and folds flange 30 up into die 116. The die is preferably fitted with a U shaped ejector 110, which is thicker than the punch 54 in order to provide room for the flange 30. Ejector 110 yields upward under resilient pressure, and is then restored by its springs.

These parts were all described in the preliminary description of FIG. 7. They are also shown in FIGS. 8 and 9, the upwardly movable lancing punches being shown at 54 in FIG. 8, and the mating dies being shown at 110 in FIG. 9.

A small part of the line of ten stations number 2 is also shown in FIG. 11, the lancing punches 54 being carried by the upwardly movable holder 44, and the ejectors 110 being carried by the fixed holder 42. The ejectors 110 are backed at 112 and are urged downward by compression springs 114, as previously mentioned in connection with FIG. 7. The section of FIG. 11 is at right angles to the section of FIG. 7.

Station 2 also has a stripper plate 60 around the punch 54 on the bottom holder 44.

STATION NUMBER 3

Figure 16:
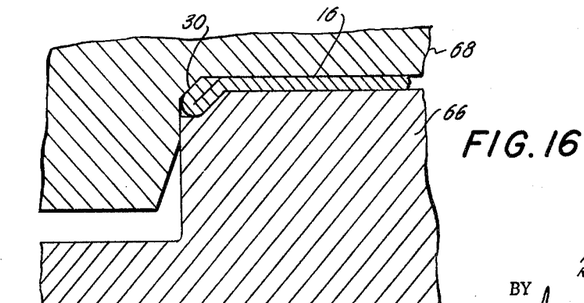
FIG. 16 is a fragmentary vertical section at the third station, and shows the mating die elements of FIG. 12.

Referring now to FIG. 16, at the third station the flange 30 is reversely folded or closed against the body of the tab 16. This is done between a lower forming die 66 carried by the bottom holder, and an upper forming die 68 carried by the fixed holder. To facilitate the closing operation, the folded flange is cammed and clamped between sloping die surfaces, and the edge therefore is disposed at an angle when leaving station number 3.

This angle is removed later in station 4, as described later.

The forming dies 66 and 68 are indicated in block form in FIG. 7, without attempting to show the surface details. FIG. 8 shows four of the forming dies 66 in bottom holder 44, and FIG. 9 shows four of the forming dies 68 in fixed holder 42.

Figure 12:
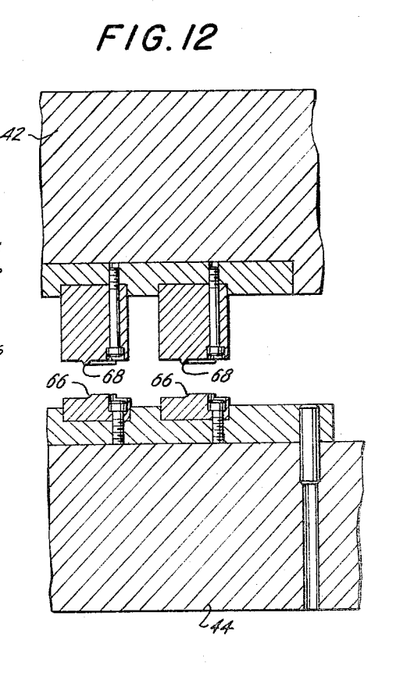
FIG. 12 is a vertical section through the third station, taken approximately in the plane of the line 12—12 of FIG. 8.

FIG. 12 is a vertical section through two of the line of ten dies at station number 3, and again shows forming dies 66 on movable holder 44, and dies 68 on fixed holder 42.

STATION NUMBER 4

Station 4 utilizes the full double action of the double-acting press, and performs three main operations. One main operation is to blank the body of the cap from the sheet. A second operation is to cup or crown the blank while restraining but not positively holding the tab. A third is to further form the tab by flattening the peripheral flange and by corrugating the tab to stiffen the same and to provide ridges.

FIG. 3 shows the flattened peripheral flange 16, the four ridges 18 and 20, and the crowning of the body at 12 and 14. The ridges 18 and 20 are left between two narrow channels 19 and a wide channel 21.

Referring now to FIG. 6, the shaping of the tab is accomplished between a die insert 150 which is carried by movable bottom holder 44, and a die insert 152 which is carried generally by fixed holder 42. However, the insert 152 is not mounted directly on holder 42, as might be expected, but rather is mounted on a resiliently yieldable plate 72, which here acts also as a stripper plate for the blanking operation in the same station. The die action of the insert becomes positive only in the last ⅛ to ⅜ and preferably ¼ of the cupping operation.

Referring next to FIG. 8, four of the inserts 150 are shown in bottom holder 44, these being secured in mating recesses by appropriate cap screws 154. (Many screws for other die elements have been omitted in FIGS. 8 and 9 in order to simplify the drawing.)

FIG. 9 shows four of the upper inserts 152 secured by cap screws 156 on movable stripper plate 72, the compression springs of which are indicated in broken lines at 73.

Figure 17:
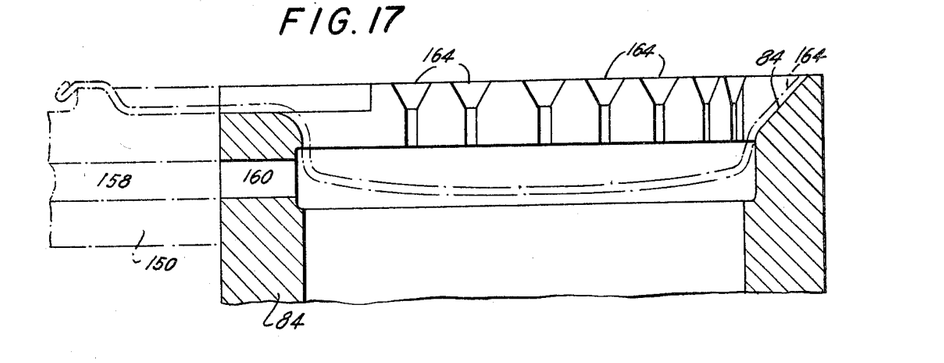
FIG. 17 is a fragmentary vertical section showing a part of the fourth station.
Figure 18:
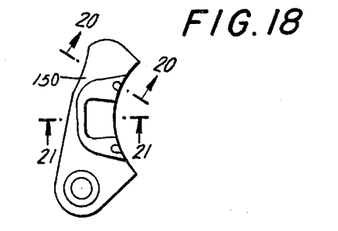
FIG. 18 is a plan view of a forming die insert used in the bottom holder at the fourth station.
Figure 19:
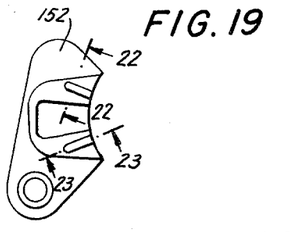
FIG. 19 is a bottom view of a forming die insert used in the yieldable stripper plate at the fourth station.
Figure 20:
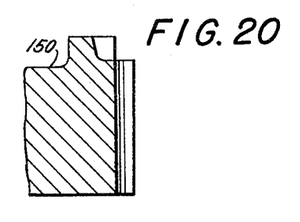
FIG. 20 is a fragmentary enlarged section taken in the plane of the line 20—20 of FIG. 18.
Figure 21:
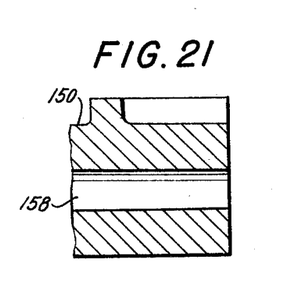
FIG. 21 is a fragmentary enlarged section taken in the plane of the line 21—21 of FIG. 18.
Figure 22:
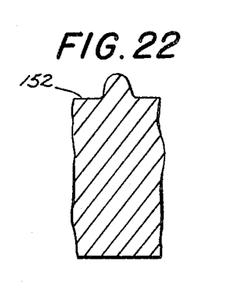
FIG. 22 is a fragmentary enlarged section taken in the plane of the line 22—22 of FIG. 19.
Figure 23:
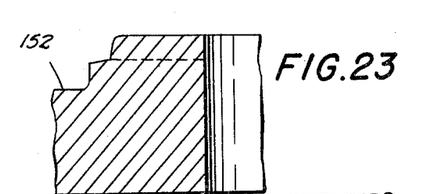
FIG. 23 is a fragmentary enlarged section taken in the plane of the line 23—23 of FIG. 19.

These parts are shown in greater detail in FIGS. 18 through 23, the bottom insert 150 being shown in FIG. 18, with sections therethrough being shown in FIGS. 20 and 21. FIG. 21 also shows a horizontal hole 158 which receives a pin for properly orienting the ridges of the serrated annular forming die 84 (FIG. 17) with the ridges of the tab, the hole 158 registering with a mating hole 160 shown in FIG. 17. The upper insert 152 is shown in FIG. 19, and sections therethrough are shown in FIGS. 22 and 23. The upper insert has ridges, and the lower insert has recesses, because the channels 19 and 21 shown in FIG. 3 are formed downward.

The blanking operation is on the line 34 shown in FIG. 1 and also shown in FIG. 13. Referring to FIG. 7, annular movable die 82 moves upward against stripper plate 72; and these together move upward against fixed blanking punch 70 to shear the metal. The top of serrated annular forming die 84 is below the top of blanking die 82 in order to provide clearance for the blanking operation.

In FIG. 8, four of the annular blanking dies are shown at 82. It will be understood that the term "annular" is used for convenience, but that actually the die is less than a circle, a part of the circle being occupied by insert 150.

FIG. 9 shows four of the blanking punches at 70. Here again the punches are not truly annular, a part of the periphery being occupied by inserts 152. However, the punch body may be annular or tubular, but a part is cut away at the bottom to clear the insert 152. This notched or cut away portion of punch 70 is shown in FIG. 7 at 162.

After the blanking operation, and while the periphery of the blank is held between the still resiliently yieldable stripper plate 72 (FIG. 7) and the upwardly moved blanking die 82, the top holder 40 descends, thereby moving the forming core 94 downward through the punch 70 and against the body of the blank, which then is forced downward to cup the blank. The top edge of annular forming die 84 is serrated, in accordance with conventional practice in the manufacture of ordinary round caps. These serrations are shown to larger scale in FIG. 17 at 164. They result in the peripheral wall metal being ridged or corrugated. The tab moves to permit a flow of metal into the body of the cap. The lower end of core 94 is slightly convex, and the upper end of core 86 is slightly concave, to give the top of the cap a desired curvature.

The diameter of core 94 is somewhat less than the inside diameter of die 84, at least twice the thickness of the metal stock. The periphery of the cap is received therebetween, but the ridges are disposed in the serrations of the die 84.

After the cup has been largely formed, to say ⅝ to ⅞ of its depth, preferably say ¾ of its depth, the stripper plate 72 "bottoms" on stop pins, and the die inserts 150 and 152 form or complete the formation of channels and ridges in the tab. As will be seen in FIG. 8, the serrations 164 are uniform around the body of the cap and at the corners of the tab, but are modified inside the tab to register with the two narrow and the single wide channel formed inside the tab. The end channels 17 are just inside the corner of the tab, and help support the tab against bending.

In the particular bottle cap shown, the crimps around the body are disposed at a pitch of 17°34′, which corresponds to twenty-one ridges in a conventional round bottle cap. By ridge is meant a ridge inward or toward the glass bottle. Sixteen ridges and seventeen channels are here conventional. The tab occupies the spacing of what would be seven of the uniform channels, but the tab has only five channels. The end two of the five channels lead to the corners of the tab.

The tab has a smothly finished edge, and is stiffened by its rolled-over flange. It is rigidly related to the body of the cap because of the stiffening effect of the aforesaid five channels, these being the wide channel 21 (FIG. 3), the two narrow channels 19, and the end two channels 17 of the seventeen channels which are at standard spacing. The said rigid relation of tab to cap is important when opening the bottle.

As shown in FIG. 13, the lancing of holes in the first station removes what otherwise would be the ends of the flange. The end two channels 17 of the seventeen standard channels are at the corners of the tab, and the necessary flow of metal for their formation is made possible and is greatly facilitated by this elimination of the flange ends.

The cap is stripped from station 4 and falls gravitationally into a suitable box or conveyor. The gravitational delivery is aided by inclining the die, the stock being fed on a slope, and the double-acting press being built at an angle for this purpose. To assure stripping of the cap from the die for free gravitational fall, the bottom core 86 is spring-mounted, it being restored to the upper position shown in FIG. 7 by compression spring 90. It is additionally provided with a stripper pin 88 which is moved upward by a compresson spring 92. The top core 94 is itself provided with a stripper pin 96 operated by a compression spring 98.

It is believed that the construction and operation of our improved progressive die, for use in a double-acting press for making manually openable crown bottle caps, as well as the advantages thereof, will be apparent from the foregoing detailed description. It will also be apparent that while we have shown and described the invention in a preferred form, changes may be made without departing from the scope of the invention, as sought to be defined in the following claims.

We claim:

1. A progressive die for making a crown bottle cap having a body and a tab for manual removal, said die comprising relatively movable holders, punches on one holder and mating dies on the other holder at a first station for making small holes at the two intersections of the tab blank periphery and the body blank periphery, a U shaped lancing punch on one holder and a mating die on the other holder at a second station to form a flange defining the tab between said holes, and mating forming dies on said holders at a third station to close the flange defining the tab.

2. A progressive die for making a crown bottle cap having a body and a tab form annual removal, said die comprising relatively movable holders, lancing punches on one holder and mating dies on the other holder at a first station for lancing approximately semicircular holes at the two intersections of the tab blank periphery and the body blank periphery, a U shaped lancing punch on one holder and a mating die on the other holder at a second station to form a flanged defining the tab between said lanced holes, and mating forming dies on said holders at a third station to close the flange defining the tab.

3. A die for use in a double-acting press for making a crown bottle cap having a body and a tab for manual removal, said die comprising a movable top holder, a fixed holder, a movable bottom holder, a body blanking punch and a resiliently yieldable stripper plate on said fixed holder, said stripper plate having a tab rib forming die, a mating tab rib forming die and a body blanking die and a serrated annular forming die within said blanking die on said bottom holder, and a forming core on said top holder and movable through said body blanking punch and said serrated forming die to crown and form ribs around the cap.

4. A die for use in a double-acting press for making a crown bottle cap having a body and a tab for manual removal, said die comprising a movable top holder, a fixed holder, a movable bottom holder, a body blanking punch and a resiliently yieldable stripper plate on said fixed holder, said stripper plate having a tab rib forming die, a mating tab rib forming die and a body blanking die and a serrated annular forming die within said blanking die on said bottom holder, and a forming core on said top holder and movable through said body blanking punch and said serrated forming die to crown and form ribs around the cap, said serrated forming die having a core which is downwardly movable a limited amount, and resilient means to restore the core to upper position, said cores having resilient ejector pins.

5. A progressive die for use in a double-acting press for making a crown bottle cap having a body and a tab for manual removal, said die comprising a movable top holder, a fixed holder, a movable bottom holder, a U shaped lancing punch on said bottom holder and a mating die and stripper on said fixed holder at one station to form a flange defining the tab, mating forming dies on said bottom and fixed holders at another station to close the flange defining the tab, a body blanking punch and stripper plate on said fixed holder at a further station, a body blanking die and a serrated annular forming die within said blanking die on said bottom holder at said further station, and a forming core on said top holder and movable through said body blanking punch and said serrated forming die to crown and form ribs around the cap at said further station.

6. A progressive die for use in a double-acting press for making a crown bottle cap having a body and a tab for manual removal, said die comprising a movable top holder, a fixed holder, a movable bottom holder, a U shaped lancing punch on said bottom holder, and a mating die and stripper on said fixed holder at one station to form a flange defining the tab, mating forming dies on said bottom and fixed holders at another station to close the flange defining the tab, a body blanking punch and stripper plate on said fixed holder at a further station, a body blanking die and a serrated annular forming die within said blanking die on said bottom holder at said further station, and a forming core on said top holder and movable through said body blanking punch and said serrated forming die to crown and form ribs around the cap at said further station, said serrated forming die having a core which is downwardly movable a limited amount, and resilient means to restore the core to upper position, said cores having resilient ejector pins.

7. A progressive die for use in a double-acting press for making a crown bottle cap having a body and a tab for manual removal, said die comprising a movable top holder, a fixed holder, a movable bottom holder, a U shaped lancing punch on said bottom holder and a mating die and stripper on said fixed holder at one station to form a flange defining the tab, mating forming dies on said bottom and fixed holders at another station to close the flange defining the tab, a body blanking punch and a resiliently yieldable stripper plate on said fixed holder at a further station, said stripper plate having a tab rib forming die, a mating tab rib forming die and a body blanking die and a serrated annular forming die within said blanking die on said bottom holder at said further station, and a forming core on said top holder and movable through said body blanking punch and said serrated forming die to crown and form ribs around the cap at said further station.

8. A progressive die for use in a double-acting press for making a crown bottle cap having a body and a tab for manual removal, said die comprising a movable top holder, a fixed holder, a movable bottom holder, a U shaped lancing punch on said bottom holder and a mating die and stripper on said fixed holder at one station to form a flange defining the tab, mating forming dies on said bottom and fixed holders at another station to close the flange defining the tab, a body blanking punch and a resiliently yieldable stripper plate on said fixed holder at a further station, said stripper plate having a tab rib forming die, a mating tab rib forming die and a body blanking die and a serrated annular forming die within said blanking die on said bottom holder at said further station, and a forming core on said top holder and movable through said body blanking punch and said serrated forming die to crown and form ribs around the cap at said further station, said serrated forming die having a core which is downwardly movable a limited amount, and resilient means to restore the core to upper position, said cores having resilient ejector pins.

9. A progressive die for use in a double-acting press for making a crown bottle cap having a body and a tab for manual removal, said die comprising a movable top holder, a fixed holder, a movable bottom holder, lancing punches on said bottom holder and mating dies on said fixed holder at a first station for lancing approximately semicircular holes at the two intersections of the tab blank periphery and the body blank periphery, a U shaped lancing punch on said bottom holder and a mating die and stripper on said fixed holder at a second station to form a flange defining the tab between said lanced holes, mating forming dies on said bottom and fixed holders, at a third station to close the flange defining the tab, a body blanking punch and stripper plate on said fixed holder at a fourth station, a body blanking die and a serrated annular forming die within said blanking die on said bottom holder at said fourth station, and a forming core on said top holder and movable through said body blanking punch and said serrated forming die to crown and form ribs around the cap at said fourth station.

10. A progressive die for use in a double-acting press for making a crown bottle cap having a body and a tab for manual removal, said die comprising a movable top holder, a fixed holder, a movable bottom holder, lancing punches on said bottom holder and mating dies on said fixed holder at a first station for lancing approximately semicircular holes at the two intersections of the tab blank periphery and the body blank periphery, a U shaped lancing punch on said bottom holder and a mating die and stripper on said fixed holder at a second station to form a flange defining the tab between said lanced holes, mating forming dies on said bottom and fixed holders at a third station to close the flange defining the tab, a body blanking punch and stripper plate on said fixed holder at a fourth station, a body blanking die and a serrated annular forming die within said blanking die on said bottom holder at said fourth station, and a forming core on said top holder and movable through said body blanking punch and said serrated forming die to crown and form ribs around the cap at said fourth station, said serrated forming die having a core which is downwardly movable a limited amount, and resilient means to restore the core to upper position, said cores having resilient ejector pins.

11. A progressive die for use in a double-acting press for making a crown bottle cap having a body and a tab for manual removal, said die comprising a movable top holder, a fixed holder, a movable bottom holder, lancing punches on said bottom holder and mating dies on said fixed holder at a first station for lancing approximately semicircular holes at the two intersections of the tab blank periphery and the body blank periphery, a U shaped lancing punch on said bottom holder and a mating die and stripper on said fixed holder at a second station to form a flange defining the tab between said lanced holes, mating forming dies on said bottom and fixed holders at a third station to close the flange defining the tab, a body blanking punch and stripper plate on said fixed holder at a fourth station, said stripper plate having a tab rib forming die, a mating tab rib forming die and a body blanking die and a serrated annular forming die within said blanking die on said bottom holder at said fourth station, and a forming core on said top holder and movable through said body blanking punch and said serrated forming die to crown and form ribs around the cap at said fourth station.

12. A progressive die for use in a double-acting press for making a crown bottle cap having a body and a tab for manual removal, said die comprising a movable top holder, a fixed holder, a movable bottom holder, lancing punches on said bottom holder and mating dies on said fixed holder at a first station for lancing approximately semicircular holes at the two intersections of the tab blank periphery and the body blank periphery, a U shaped lancing punch on said bottom holder and a mating die and stripper on said fixed holder at a second station to form a flange defining the tab between said lanced holes, mating forming dies on said bottom and fixed holders at a third station to close the flange defining the tab, a body blanking punch and stripper plate on said fixed holder at a fourth station, said stripper plate having a tab rib forming die, a mating tab rib forming die and a body blanking die and a serrated annular forming die within said blanking die on said bottom holder at said fourth station, and a forming core on said top holder and movable through said body blanking punch and said serrated forming die to crown and form ribs around the cap at said fourth station, said serrated forming die having a core which is downwardly movable a limited amount, and resilient means to restore the core to upper position, said cores having resilient ejector pins.

13. A progressive die as defined in claim 5 in which the die is wide in order to operate on wide sheet stock, and has a row of punches and dies at each of the stations, and in which there are support bars extending in the direction of travel of the sheet, at intervals across the width of the sheet, said support bars being shorter than the die and extending through only the earlier stations but not the last station, whereby no stock is wasted by reason of the space required for the support bars.

14. A progressive die as defined in claim 9 in which the die is wide in order to operate on wide sheet stock and has a row of punches and dies at each of the first, second, third, and fourth stations, and in which there are support bars extending in the direction of travel of the sheet, at intervals across the width of the sheet, said support bars being shorter than the die and extending through only the first, second and third stations but not the fourth station, whereby no stock is wasted by reason of the space required for the support bars.

15. A progressive die as defined in claim 12 in which the die is wide in order to operate on wide sheet stock, and has a row of punches and dies at each of the first, second, third, and fourth stations, and in which there are support bars extending in the direction of travel of the sheet, at intervals across the width of the sheet, said support bars being shorter than the die and extending through only the first, second, and third stations but not the fourth station, whereby no stock is wasted by reason of the space required for the support bars.

References Cited by the Examiner

UNITED STATES PATENTS

| | | | |
|---|---|---|---|
| 1,131,676 | 3/1915 | Cake | 113—121 |
| 1,768,294 | 6/1930 | Reid | 113—121 |
| 1,995,357 | 3/1935 | Liss | 113—121 |
| 2,148,906 | 2/1939 | Jonsson | 72—329 |
| 2,186,519 | 1/1940 | Buono | 113—121 |
| 2,349,037 | 5/1944 | Gibbs | 113—121 |

CHARLES W. LANHAM, *Primary Examiner.*

R. J. HERBST, *Assistant Examiner.*